United States Patent [19]
Nagl

[11] Patent Number: 5,302,361
[45] Date of Patent: Apr. 12, 1994

[54] MULTI-BED MASS TRANSFER COLUMN WITH MOBILE PACKING

[75] Inventor: Gary J. Nagl, Deer Park, Ill.

[73] Assignee: Ari Technologies, Inc., Palatine, Ill.

[21] Appl. No.: 682,545

[22] Filed: Apr. 8, 1991

[51] Int. Cl.$^5$ .............................................. C01B 17/16
[52] U.S. Cl. ............................. 423/220; 423/231; 423/DIG. 16; 422/140; 422/142; 422/176; 261/DIG. 72; 95/221; 95/235
[58] Field of Search ............... 423/231, DIG. 16, 220; 422/140, 141, 142, 176; 210/795, 678; 502/527; 261/DIG. 72, 94, 96; 55/91

[56] References Cited

U.S. PATENT DOCUMENTS

| | | | |
|---|---|---|---|
| 3,302,372 | 2/1967 | Hynson et al. | 55/73 |
| 3,556,490 | 1/1971 | Bockman | 261/98 |
| 4,011,304 | 3/1977 | Mancini et al. | 423/573 G |
| 4,108,682 | 8/1978 | Takeda et al. | 134/25 R |
| 4,125,597 | 11/1978 | Fleck | 423/573 R |
| 4,189,462 | 2/1980 | Thompson | 423/573 G |
| 4,218,342 | 8/1980 | Thompson | 252/431 C |
| 4,374,104 | 2/1983 | Primack | 423/226 |
| 4,455,287 | 6/1984 | Primack et al. | 423/573 R |
| 4,622,212 | 11/1986 | McManus et al. | 423/226 |
| 4,668,405 | 5/1987 | Boze | 210/795 |
| 4,719,020 | 1/1988 | Elmaleh | 210/807 |

FOREIGN PATENT DOCUMENTS

| | | | |
|---|---|---|---|
| 2702972 | 7/1977 | Fed. Rep. of Germany | 210/678 |
| 61-204020 | 9/1986 | Japan | 422/176 |

*Primary Examiner*—Gary P. Straub
*Assistant Examiner*—Timothy C. Vanoy
*Attorney, Agent, or Firm*—Allegretti & Witcoff, Ltd.

[57] ABSTRACT

A packed mass transfer tower for establishing intimate gas/liquid contact and efficient mass transfer that is less susceptible to gas or liquid channeling, gas surging and uneven distribution of gas or liquid across the cross-sectional area of the tower. The packed tower includes a packing arrangement including a lower bed of mobile packing elements, and an adjacent upper bed of fixed packing elements. The packed bed of fixed packing elements acts as a gas distributor, as well as causing good gas/liquid contact, to provide an even flow of gas across essentially the entire cross-sectional area of the packed bed of mobile packing elements.

13 Claims, 2 Drawing Sheets

MULTI-BED MASS TRANSFER COLUMN WITH MOBILE PACKING

FIELD OF THE INVENTION

This invention relates to packed tower or packed column structures used for intimate contact between a gas and a liquid to effect mass transfer therebetween. More particularly, this invention relates to a specific packing arrangement for a packed tower containing a combination of one or more mobile packing material stages and one or more fixed bed packing material stages to minimize plugging of the packing material resulting from the production of solid material formed by gas/liquid mass transfer, and to provide a more even distribution of gas through the packing material. The packing arrangement is particularly useful for gas/liquid mass transfer in relatively large absorption towers having a cross-sectional area more than about 3 ft$^2$, where gas channeling, and surging of gas and packing material is most prevalent. The fixed packing material not only serves as a gas/liquid contacting device, but also serves as a gas distributor for the mobile packing elements to achieve even gas distribution. This invention is particularly useful in gas/liquid contacting processes where the packed tower or column is prone to undergo plugging due to the presence or formation of solid reactant or reaction product material within the tower.

BACKGROUND OF THE INVENTION

It is well known that packed towers or columns are often useful for efficient gas/liquid contact to provide interactions, reactions and other mass transfer operations between gas and liquid. However, in some such operations the fluid passing through the packed bed contains suspended solid particles that tend to accumulate on the packing, eventually resulting in a reduction in gas/liquid volumetric flow rates and, in extreme cases, plugging of the tower.

Such plugging problems occur, for example, when a packed tower is used with liquids or gases that contain particulate material, or when particulates are formed within the tower as a result of a chemical interaction, reaction or the like, that precipitates solids as a result of mass transfer between the liquid and the gas. For example, in flue gas scrubbing that utilizes a liquid stream that includes an aqueous solution or suspension of limestone, or the like, to remove sulfur dioxide contained in a gas stream, a calcium sulfate precipitate is formed in the tower, and the resulting aqueous slurry causes plugging problems. Another example is a gas/liquid interphase oxidation process for removal of hydrogen sulfide from a gas stream that uses an oxidizing solution to effect oxidation of hydrogen sulfide to form elemental sulfur particles. Such particles may cause plugging of packed towers, requiring periodic shutdown of the process for a difficult and time consuming cleaning of the tower.

Some prior processes have used packed towers for contact of hydrogen sulfide ($H_2S$)-containing gases with an aqueous iron-chelate solution or a so-called "Stretford"-type alkaline vanadium ion-containing wash solution that converts $H_2S$ to elemental sulfur ($S°$). The elemental sulfur formed is entrained in the liquid mixture, and subsequently removed from the liquid, e.g., by settling or filtration. In this type of $H_2S$ removal process, some of the sulfur settles on the packing material, thereby lowering gas and liquid flow rates and, ultimately, the sulfur plugs the tower. Mobile packing beds have been used in packed towers for sulfur removal from $H_2S$-containing gas streams but suffer from uneven gas distribution and channeling problems, particularly in larger cross-sectional area towers, resulting in decreased efficiency.

It is well known that two of the most important characteristics necessary for effective and efficient gas/liquid mass transfer in packed towers are 1) the tower must contain adequate passages for both the liquid and the gas streams without excessive liquid holdup or pressure drop; and 2) the tower must provide good contact between liquid and gas. The requirement of good contact between liquid and gas is the most difficult to meet, especially in large towers. Ideally, the liquid, once distributed over the top of the packing, flows in thin films over all the packing surface completely down the tower. Actually, the films tend to grow thicker in some places and thinner in others, so that the liquid collects into small rivulets and flows along localized paths through the packing. Especially at low liquid rates, and in the larger towers, some of the packing surface may be dry or covered with a stagnant film of liquid. This effect is known as "channeling" and is the main reason for poor performance in large packed towers. Similarly, a countercurrently flowing gas stream, especially in larger towers, sometimes tends to follow localized paths instead of being distributed across the entire cross-section of the tower, with a consequent increase in velocity through these localized paths, and this effect is known as "surging".

The use of mobile packing beds tends to decrease or eliminate packing material fouling, adds to the "channeling" and "surging" problems inherent in packed towers of relatively large cross-sectional area due to the tendency of the relatively light mobile packing material to collect along the sides and other localized areas of the tower, further decreasing the desired cross-sectional uniformity of gas and liquid flow. This reduces the overall efficiency in relatively large mobile bed gas/liquid contact devices. This problem has been recognized for many years but, to date, no adequate solution to the channeling and surging problems has been achieved. Others have provided vertical partitions in the columns between grids, to provide a plurality of partitioned packing beds between adjacent grids, thereby decreasing the cross-sectional area of each separate packing bed. This partitioning has aided the gas and liquid flow uniformity, but not completely satisfactorily, and has created other problems, such as the attendant difficulty in loading and unloading packing material and making sure that loading is done uniformly within each separate compartment.

The present invention solves this gas/liquid flow problem within mobile bed packed towers, by including at least one bed of mobile packing elements supported on a fluid-pervious grid disposed vertically below at least one bed of fixed packing elements supported on another fluid-pervious grid.

SUMMARY OF THE INVENTION

In brief, the present invention is directed to a packed mass transfer tower for establishing intimate gas/liquid contact and efficient mass transfer that is less susceptible to gas or liquid channeling, gas surging and uneven distribution of gas or liquid across the cross-sectional area of the tower. The packed tower includes a packing arrangement having a mobile bed mass transfer stage including at least one bed of mobile packing material, such as hollow spheres, packed in the usual arrangement, e.g., preferably such that when static, the height of the mobile packing material is at most 75% of the height of the spacing between upper and lower grids that define the mobile packing material-containing stage of the tower. Disposed directly above and vertically adjacent to one or more mobile packing material-containing beds, and sharing a common grid with an adjacent, lower mobile bed, is one or more beds of fixed packing material that act as a gas distributor, as well as being a material that causes good gas/liquid contact, to provide an even flow of gas across essentially the entire cross-sectional area of the fixed packing material for even gas distribution to the adjacent lower mobile packing element-containing stage. The adjacent bed(s) of fixed packing material provide sufficient pressure drop to prevent the mobile packing elements in one or more lower mobile beds from partitioning and thereby prevent uneven gas flow through the mobile stage, e.g., up one side of the tower. The fixed packing elements hug the lower pervious grid of the packed bed to evenly distribute gas to the lower adjacent stage of mobile packing elements, thereby achieving efficient mass transfer without significant channeling or surging problems.

Accordingly, one aspect of the present invention is to provide a new and improved mass transfer tower and method of achieving efficient gas/liquid contact.

Another aspect of the present invention is to provide a method of continuously contacting gas and liquid in a bed of mobile packing elements while essentially eliminating channeling and surging problems to maintain a uniform flow distribution of gas and liquid across the cross-sectional area of the bed of packing elements.

Another aspect of the present invention is to provide a mass transfer tower that includes at least one lower bed of mobile packing elements capable of substantial vertical displacement during mass transfer between countercurrently flowing gas and liquid streams, and at least one upper bed of fixed packing elements that are held relatively closely together during mass transfer to provide both mass transfer efficiency and even gas and liquid distribution over the cross-sectional area of both the mobile and fixed packed beds.

Still another aspect of the present invention is to provide a gas/liquid contact tower including a lower bed of relatively light, mobile packing elements as well as an upper bed of relatively heavy, vertically fixed packing elements to achieve a gas/liquid contact tower containing separated beds of fixed and mobile packing elements wherein at least one bed of fixed packing elements is disposed above at least one bed of mobile packing elements, to achieve good gas/liquid contact since the bed(s) of fixed packing material act as a gas distributor to cause even distribution of gas upwardly to the agitated and aerated mobile packing elements.

A further aspect of the present invention is to provide an improved method of removing hydrogen sulfide from a hydrogen sulfide-containing gas stream with a liquid phase oxidation solution wherein hydrogen sulfide is converted to elemental sulfur, using both mobile and relatively fixed beds of packing elements within a packed tower.

Another aspect of the present invention is to provide an improved packed tower for efficient gas/liquid contact that has a reduced rate of packed tower plugging, while maintaining excellent gas/liquid contact and high solid particle removal efficiency.

Other aspects and advantages will be apparent to those skilled in the art from the following detailed description of the preferred embodiment, taken in conjunction with the drawings and the appended claims.

DETAILED DESCRIPTION OF THE PREFERRED EMBODIMENT

Figure 1:
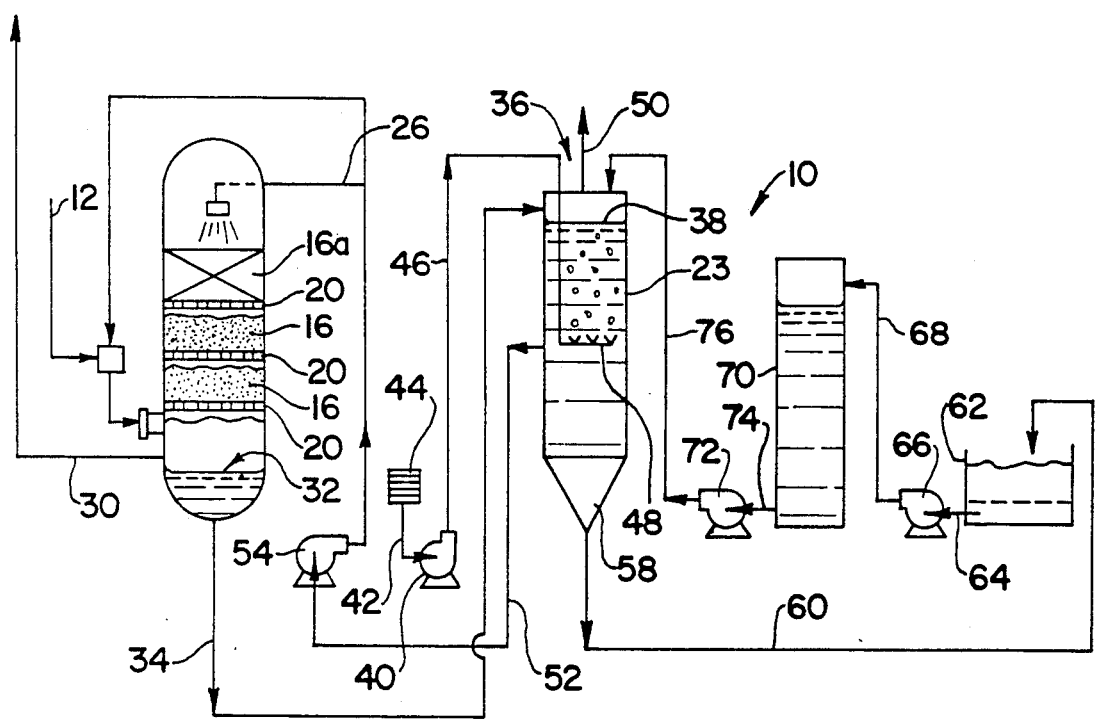
FIG. 1 is a simplified flow diagram of a gas/liquid contact oxidation process for removing hydrogen sulfide from a gas stream using the packed tower apparatus of the present invention.

For purposes of illustration only, and not by way of limitation, the invention is described with specific reference to a liquid phase oxidation process for the removal of hydrogen sulfide from a gas stream. In a process of this type, e.g., the so-called Stretford process, or the process marketed under the trademark LO-CAT ® by ARI Technologies, Inc. of Palatine, Ill., a hydrogen sulfide-containing gas is contacted in a gas/liquid contactor or tower with a suitable aqueous treating solution, e.g., an oxidizing solution containing a polyvalent metal in its higher valence state, such as a chelated iron solution. In the contactor, hydrogen sulfide is oxidized to elemental sulfur in the form of solid particles that are entrained (e.g., suspended or slurried) in the treating solution, and the polyvalent metal is reduced to its lower valence state. The solution is subsequently regenerated by contact with air or another oxygen-containing gas to convert the reduced polyvalent metal to its higher valence state for use in the contactor. The sulfur formed in the contactor is subsequently recovered from the aqueous treating solution by flotation, settling, filtration, or any other suitable separation technique.

When using a packed tower as a contactor, countercurrent contacting is usually preferred but cocurrent contacting can be used under some circumstances. In a countercurrent system, the hydrogen sulfide-containing gas is passed upwardly through the packed bed(s) and the aqueous treating solution is passed downwardly through the packed bed(s) in intimate contact with the upwardly flowing gas stream. The sulfur particles formed by the oxidation of hydrogen sulfide tend to accumulate on the packing or on the packing support grid resulting in eventual plugging of the tower. In most instances, the plugged tower must be periodically taken out of service for removal and washing of the packing and for cleaning of the support grid. Consequently, in the past it has usually been necessary to provide two or more packed towers so that at least one tower is available for continuous operation of the process while the other tower is being serviced.

It will be understood that the apparatus and process configurations shown in the drawings are illustrative only and that the inventive process and apparatus can be used with the Stretford or various LO-CAT® or other catalytic polyvalent metal redox processes familiar to those skilled in the art, such as those disclosed in U.S. Pat. Nos. 4,011,304; 4,125,597; 4,189,462; 4,218,342; 4,374,104; 4,455,287; 4,622,212; and 4,865,819. These patents illustrate the known chemistry for $H_2S$ gas conversion to elemental sulfur and the combinations of oxidizing/reducing metals and chelating agents capable of converting $H_2S$ gas to elemental sulfur over a wide range of pH and other process conditions. Although iron and vanadium are the polyvalent metals which are most commonly used, chelating agent solutions of other metals including copper, platinum, tungsten, nickel, mercury, tin, lead, and the like also can be used.

FIG. 1 is an illustration of one manner of utilizing the packed tower of the present invention in the LO-CAT®, chelated iron sulfur removal process, generally designated by reference numeral 10, but the packed towers of the present invention also can be used with Stretford and other liquid redox processes.

A feed gas stream containing hydrogen sulfide is introduced through conduit 12, optionally to a venturi mixer 14, where the gas is intimately pre-mixed with regenerated chelated iron solution supplied to the mixer 14 through conduit 16. The outlet from the mixer 14 communicates with a lower portion of a vertical multi-bed packed scrubbing tower, generally designated by reference numeral 18. In the embodiment of the invention illustrated in FIG. 2, packing support grids 20 are mounted in the tower 18, as shown, to define a volume for one or more adjacent beds of mobile packing elements, generally designated 22, and, above the bed(s) of mobile packing elements 22, one or more adjacent, upper bed(s) of fixed packing elements, generally designated 24, are disposed between spaced grids 20. The packing material forming the mobile and fixed packed beds 22 and 24 can be formed of any mobile and fixed packing materials, but to achieve the full advantage of the present invention the mobile packing elements preferably are spherical packing elements 22a. One or more loosely packed beds 22 of discrete mobile packing elements 22a is supported on an associated grid 20, and one or more beds 24 of discrete fixed packing elements 24a is supported on an adjacent lower grid 20, such that the mobile packed bed(s) 22 are disposed adjacent to and below at least one bed 24 of fixed packing elements 24a to provide the advantages of the present invention, as described in more detail hereinafter.

Figure 2:
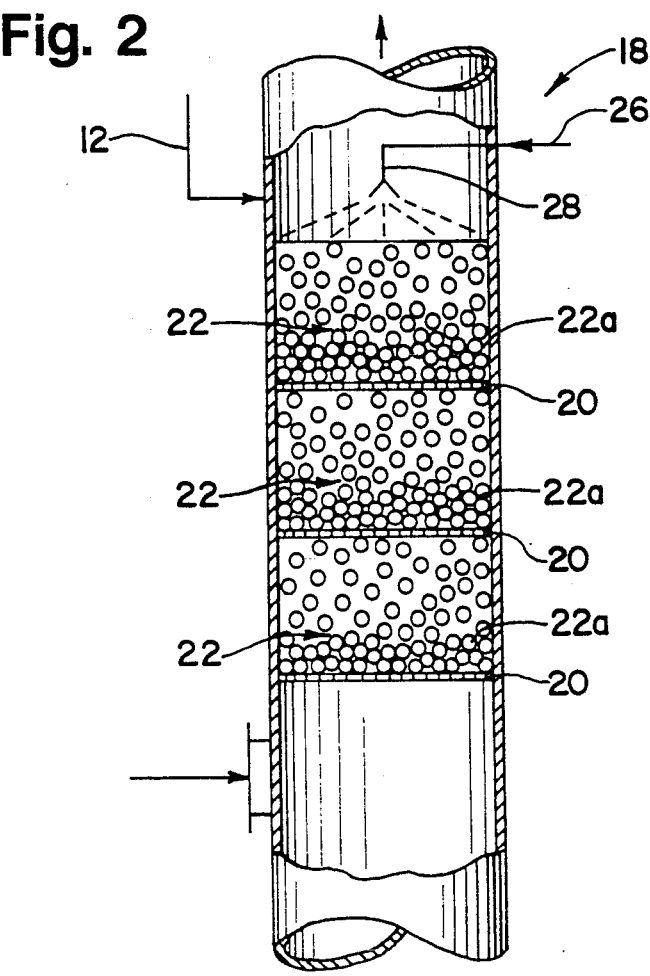
FIG. 2 is a partially broken-away, elevational view of the packed tower of FIG. 1, illustrating the distribution of packing elements within the fixed and mobile packed beds during countercurrent gas and liquid flow.

FIGS. 1 and 2 show one fixed bed 24 disposed vertically above two mobile beds 22, but any number of mobile beds 22 disposed below any number of fixed beds 24 will provide the advantages of the present invention. Regenerated treating solution is supplied to an upper portion of the tower 18 through conduit 26, and a spray nozzle 28. An effluent gas conduit 30 extends from the upper portion of the tower 18 above the mist eliminator 27 for removal of substantially $H_2S$-free treated gas. The mobile packing elements 22a preferably are spherical and may be hollow or solid, but should be capable of being aerated upwardly during normal flow rates of gas and liquid in the tower 18. The fixed packing elements 24a are heavy enough so that they are not aerated during normal flow rates of liquid and gas through the tower 18.

The feed gas passes upwardly through the packed beds 22 and 24, and treating solution from the spray nozzle 28 passes downwardly through the beds 24 and 22, in countercurrent contact with the upwardly flowing gas stream. The treated gas, which is substantially free of hydrogen sulfide, passes through mist eliminator 27 and is removed from the upper portion of the tower 18 through conduit 30. A dilute liquid slurry of treating solution and suspended sulfur particles accumulates in the lower portion of the tower 18, as indicated by the upper liquid level 32, and the slurry is withdrawn at a controlled rate through conduit 34.

The used treating solution containing reduced metallic ions, e.g., reduced forms of iron ($Fe^{+2}$) or vanadium ions ($V^{+4}$), is regenerated by passing the slurry from conduit 34 into an upper portion of an oxidizer vessel, generally designated by reference numeral 36, where the slurry accumulates, as shown by the upper liquid level 38. Air is supplied to the oxidizer 36 by means of a blower 40 having an inlet conduit 42 associated with gas filter 44, and an outlet conduit 46 connected to a sparger ring 48 located in the oxidizer vessel 36 substantially below the liquid level 38. Air from the sparger ring 48 bubbles upwardly through the used treating solution and oxidizes the metallic ions in the catalytic polyvalent metal redox solution to their higher valence state, e.g., $Fe^{+3}$ or $V^{+5}$. The air, having a slightly diminished oxygen content, is vented from an upper portion of the oxidizer vessel 36 through conduit 50. The regenerated treating solution is withdrawn from the oxidizer vessel 36, below the sparger ring 48 through a suction conduit 52 by means of recirculating pump 54 and is supplied to the tower 18 through a discharge conduit 56 connected to tower inlet conduits 26 and 16.

In the oxidizer vessel 36, a major portion of the sulfur settles to a cone-shaped bottom portion 58 so that the treating solution withdrawn through conduit 52 for recirculation to the tower 18 contains only a minor amount of sulfur. A dense sulfur slurry flows from the bottom portion 58 of oxidizer vessel 36 through conduit 60 to a sulfur recovery or separation device, generally designated by reference numeral 62. The sulfur recovery or separation device 62 can be a vacuum or pressure filter, a gravity flow filter box, a centrifuge, a sulfur melter, or any available solid/liquid separation device, as known in the art. The sulfur-free filtrate is withdrawn from the recovery device 62 through conduit 64 and pump 66 and returned through conduits 68 and 70 to an upper portion of the oxidizer vessel 36. The sulfur is sent to storage via conduit 72.

The contacting of the feed gas with the treating solution in the tower 18 may be carried out at ambient temperature and pressure conditions, but temperatures of from about 5° C. to about 60° C. and pressures ranging from subatmospheric to 100 atmospheres or greater can be used. A pH ranging from about 6 to about 13, particularly from about 7.5 to about 10.5, is preferably maintained by adding alkaline material as required. The redox potential of the solution may be used as a measure of catalyst activity as reflected by the ratio of ferric to ferrous ions in solution. Maintaining a redox potential of from about $-50$ $\mu v$ to about $-300$ $\mu v$, as measured by a calomel electrode, is desirable.

FIG. 2 shows, schematically, the structure of a preferred embodiment of the gas/liquid contact scrubbing tower 18, having two beds 22 of mobile packing elements 22a with sufficient space for vertical movement of the mobile packing elements within each mobile compartment or stage, disposed below one bed 24 of fixed packing elements 24a, each supported below a grid 20 that is the same non-plugging design as the lower grid 20 of the lower adjacent mobile bed 22. Each bed 22 of mobile packing material 22a and each bed 24 of fixed packing material 24a is supported in the tower 18 on fluid-pervious grid 20. The particular design or structure of the pervious grids 20 should be of a non-plugging design, as well known in the art, but the purpose of the grids is to support and separate the contact stages, e.g., to separate each bed 22 and 24 while allowing relatively large total open area in the grids 20 to permit the passage of gas being treated and aqueous liquid for mass transfer therebetween in the tower 18.

To achieve the full advantage of the present invention, particularly for mass transfer in a process where solids are formed within the tower 18, the mobile packing elements 22a are spherical, having a diameter of about 1 centimeter to about 10 centimeters preferably about 2 centimeters to about 5 centimeters in diameter, so that the agitation, rotation and aeration of the mobile packing elements 22a achieves self-cleaning of the packing elements 22a without requiring shut down of the tower for packing material cleaning. It is preferred that the fixed packing elements 24a filling fixed bed(s) 24 are not spherical since static spherical fixed packing elements plug too quickly. Suitable fixed packing elements are, for example, CASCADE MINI RINGS® or TELLERETTES. However, the invention is not limited to a particular shape of mobile packing elements 22a or fixed packing elements 24a. Mobile packing elements 22a can be known forms of polypropylene or other plastic beads, of a size and density selected to be retained upon the grid structure 20, and a sufficiently low specific gravity, to be easily mobilized within the gas/liquid contact apparatus 18. An example of a commercially available packing material which may be used as mobile elements 22a is hollow plastic spheres manufactured by EURO-MATIC, LTD. of London, England.

Figure 3:
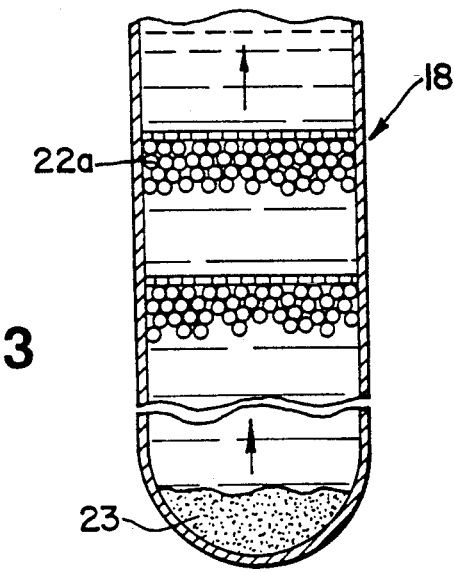
FIG. 3 is a partially broken-away, elevational view of a packed tower as used in an aerobic hydrogen sulfide removal process showing the distribution of packing elements within the fixed and mobile packed beds during countercurrent gas and liquid flow.

FIG. 3 is a schematic flow diagram illustrating an aerobic H2S-removal process, and apparatus generally designated by reference numeral 100 which is common in the wastewater treatment industry. This process and apparatus differs from the process described with reference to FIG. 1 in that the absorption of hydrogen sulfide and the reoxidation of the iron occurs in the same vessel.

FIG. 3 EXAMPLE

An air stream flowing through conduit 102 at a rate of 5,000 SCFM and containing 500 ppm (v/v) of hydrogen sulfide enters on absorber vessel, generally designated by reference numeral 104. After entering the absorber vessel 104, the air stream flows upward at a velocity generally between 200 FPM and 350 FPM, although velocities outside of this range can be employed. The air stream initially passes through a stage 106 of mobile packing elements 106a, although multiple mobile stages 106 may be employed. Each stage 106 of mobile packing elements 106a includes two grids 108 spaced approximately five feet apart. The grids may be constructed of ⅛ inch diameter wire mesh having one inch openings or any other non-plugging design. Approximately three feet of mobile packing elements 106a are disposed within the space confined by the two grids 108. The mobile packing elements 106a may be 38 mm hollow, polypropylene spheres or any type of element which is capable of being fluidized at the useful design gas velocities.

The air stream is intimately contacted countercurrently with a polyvalent metal redox solution entering the tower 104 through conduits 110 and 112 and spray nozzle 114, disposed within the tower 104 below a mist eliminator 116. The polyvalent metal redox solution comprises, for example, 100 ppm (w/w) to 4 wt % chelated iron and is circulated at a rate equivalent between 3 and 120 GPM per square foot of cross sectional area in the absorber vessel 104. The ratio of gas to liquid volume is one of the major parameters affecting the hydrogen sulfide removal efficiency within the mobile packing stage.

In this FIG. 3 embodiment, the absorption of hydrogen sulfide and oxygen into the circulating redox solution are occurring at the same time. Consequently, the chelated iron is being reduced to a lower valence state ($Fe^{+2}$) during the oxidation of hydrogen sulfide to sulfur and is being oxidized back to its higher valence ($Fe^{+3}$) with dissolved oxygen at the same time. In this example, 95% to 99% of the hydrogen sulfide will be removed from the gas stream within the mobile packing stage.

The gas stream passes through a mobile packing stage 106 and then enters a stage 118 of fixed packing elements 118a supported on grid 108 forming the top grid of the mobile packing stage 106. A sufficient volume of fixed packing elements 118a is contained in stage 118 to achieve the desired overall hydrogen sulfide removal efficiency. In this example approximately five feet of fixed packing elements 118a are employed. The gas stream is again contacted countercurrently with the circulating solution, in fixed stage 118, at the same rate as in the mobile packing stage 106.

It is important to note that the fixed packing stage 118 not only serves as a gas/liquid contacting device but also as a gas distributor for the mobile packing stage 106. Since the mobile packing elements 106a can move, there is a tendency for the mobile packing and the gas stream to partition. For example, the gas stream can channel up one side of the absorber vessel 104 while the mobile packing elements 106a accumulate on the other side of the absorber vessel 104. This condition will result in poor gas/liquid contacting and, consequently, poor removal efficiencies. The fixed packing elements 118a prevent this condition from occurring by providing sufficient pressure drop to achieve good gas distribution across the entire cross-sectional area of the absorber vessel 104.

After the treated gas stream leaves the fixed packing stage 118, it passes through the mist eliminator 116 where entrained liquid droplets are removed. The gas stream then is discharged to the atmosphere through a conduit or stack 120. The circulating liquid stream leaves the mobile packing stage 106 and accumulates in a reservoir 122 located at the bottom of the absorber vessel 104. The solution then is pumped back to the top of the absorber vessel 104 by a circulation pump 124, through conduits 110 and 112 and distributed across the top of the fixed packing stage 118 by means of the spray nozzle 114.

Sulfur settles into a conical bottom 126 of the absorber vessel 104 and then passes via conduit 128 into a sulfur separation device 130 where the sulfur is concentrated and removed through sulfur outlet conduit 132, and the filtrate 134 is returned to the absorber vessel 104 via conduits 134 and 136.

The mobile and fixed packing beds 22 and 24 (FIGS. 1 and 2); 106 and 118 (FIG. 3) arranged in the gas/liquid contact tower 18 and 104 in accordance with the present invention alleviate problems associated with low sulfur removal efficiencies in prior known mobile packing bed contact towers, and provide good gas distribution to maintain even fluidization throughout the fixed and mobile packing bed(s). With the arrangement of gas/liquid contact stages of the invention, as described, a sufficient number of stages of self-cleaning mobile packing elements are provided to convert un   ctedly high levels of hydrogen sulfide, from the ₤ being treated, as elemental sulfur particles retained in the aqueous medium. In addition, the bed 24 or 118 of fixed packing elements 24a or 118a acts as an excellent gas distributor correcting any maldistribution of the gas for contact with the liquid solution which may occur in the mobile beds 22 or 106, as well as providing good gas/liquid contact.

The foregoing detailed description is given for clearness of understanding only, and no unnecessary limitations should be understood therefrom, as modifications within the scope of the invention will be apparent to those skilled in the art.

What is claimed is:

1. A liquid phase oxidation process for removing hydrogen sulfide from a hydrogen sulfide-containing gas stream including contacting said gas stream in a gas/liquid contactor with a liquid oxidizing solution under conditions effective for oxidizing hydrogen sulfide to elemental sulfur, thereby forming solid sulfur particles that become entrained in said liquid solution, including the steps of:

contacting said $H_2S$-containing gas with said solution in a packed tower as said contactor, wherein said packed tower includes:

at least one mobile packed bed of spherical packing elements, having a diameter in the range of about 1 cm to about 10 cm, disposed in said tower;

at least one fixed packed bed disposed in said tower vertically above said mobile packed bed, wherein all of said fixed packing elements being disposed above all of the mobile packing elements, said fixed packing elements providing a bed thickness sufficient to prevent the mobile packing elements from substantial partitioning, thereby preventing uneven gas flow upwardly through the mobile packing elements and essentially eliminating gas surging and channeling through the mobile packed bed, and to achieve $H_2S$ oxidation in the fix bed;

each of said mobile and fixed packed beds being supported by a respective grid in said tower; said mobile packed bed being separated vertically from said fixed packed bed and associated support grid by a distance sufficient to permit the mobile packing elements in said mobile packed bed to effect fluidized motion from gas flow upwardly through said mobile packed bed;

flowing said $H_2S$-containing gas upwardly through the mobile packed bed and said fixed bed, respectively; and flowing the liquid solution downwardly through the fixed packed bed and said mobile packed bed, respectively, to achieve substantially uniform flow of gas and liquid over the cross-section of the tower.

2. The process of claim 1, wherein said liquid oxidizing solution comprises an aqueous polyvalent metal solution.

3. The process of claim 2, wherein said polyvalent metal is iron.

4. The process of claim 2, wherein said polyvalent metal is vanadium.

5. The process of claim 1, wherein the mobile bed includes packing elements comprising hollow polymeric spheres.

6. The process of claim 1, wherein said mobile bed is separated from said fixed bed by a common fluid-pervious grid.

7. The process of claim 6, wherein the mobile packed bed includes mobile packing elements having a density such that the packing elements are aerated under normal gas flow through the elements, and wherein the fixed bed comprises packing elements that are held in close proximity to each other during gas flow through the tower.

8. A liquid phase oxidation process for removing hydrogen sulfide from a hydrogen sulfide-containing gas stream including contacting said gas stream in a gas/liquid mobile bed packed tower with a liquid polyvalent metal redox solution under conditions effective for oxidizing hydrogen sulfide to solid particles of elemental sulfur that become entrained in said liquid solution, including the steps of:

continuously contacting said $H_2S$-containing gas with said polyvalent metal redox solution countercurrently in a packed bed of spherical mobile packing elements, having a diameter in the range of about 1 cm to about 10 cm, disposed in said tower:

continuously contacting said $H_2S$-containing gas with said polyvalent metal redox solution countercurrently in a packed bed of fixed packing elements disposed in said tower vertically adjacent to and above said mobile packed bed, wherein all of said fixed packing elements being disposed above all of the mobile packing elements, said fixed packing elements providing a bed thickness sufficient to prevent the mobile packing elements from substantial partitioning, thereby preventing uneven gas flow upwardly through the mobile packing elements and essentially eliminating gas surging and channeling through the mobile packed bed, and to achieve $H_2S$ oxidation in the fixed bed;

flowing gas sequentially upwardly through said mobile packing elements and then through said fixed packing elements; and flowing the polyvalent metal redox solution sequentially downwardly through said fixed packing elements and then through said mobile packing elements for intimate contact with said gas, substantially without gas surging or channeling.

9. The process of claim 8, wherein said liquid oxidizing solution comprises an aqueous polyvalent metal redox solution.

10. The process of claim 9, wherein said polyvalent metal is iron.

11. The process of claim 10, wherein the iron is chelated.

12. The process of claim 9, wherein said polyvalent metal is vanadium.

13. A liquid phase oxidation process for removing hydrogen sulfide from a hydrogen sulfide-containing gas stream wherein said gas stream is contacted in a gas/liquid mobile bed packed tower with a liquid polyvalent metal redox solution under conditions effective for oxidizing hydrogen sulfide to solid particles of elemental sulfur that become entrained in said liquid solution, comprising:

flowing the gas and liquid countercurrently through at least one packed bed of spherical mobile packing elements, having a diameter in the range of about 2 cm to about 5 cm, disposed in said tower; and flowing the gas and liquid countercurrently through at least one packed bed of fixedly packing elements disposed in said tower vertically adjacent to and above said mobile packed bed, wherein all of said fixed packing elements are disposed above all of the mobile packing elements, said fixed packing elements providing a bed thickness sufficient to prevent the mobile packing elements from substantial partitioning, thereby preventing uneven gas flow through the mobile packing elements and essentially eliminating gas surging and channeling through the mobile packed bed, and to achieve $H_2S$ oxidation in the fixed bed.

* * * * *